US007164811B2

(12) United States Patent
Nathanson et al.

(10) Patent No.: US 7,164,811 B2
(45) Date of Patent: Jan. 16, 2007

(54) POCKET-PEN ULTRA-HIGH RESOLUTION MEMS PROJECTION DISPLAY IN COMBINATION WITH ON-AXIS CCD IMAGE CAPTURE SYSTEM INCLUDING MEANS FOR PERMITTING 3-D IMAGING

(75) Inventors: Harvey C. Nathanson, Pittsburgh, PA (US); Robert S. Howell, Silver Spring, MD (US); Ragini Saxena, Simi Valley, CA (US); Garrett A. Storaska, Reston, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 142 days.

(21) Appl. No.: 10/879,041

(22) Filed: Jun. 30, 2004

(65) Prior Publication Data

US 2005/0206770 A1 Sep. 22, 2005

Related U.S. Application Data

(60) Provisional application No. 60/542,300, filed on Feb. 9, 2004.

(51) Int. Cl.
*G06K 9/22* (2006.01)

(52) U.S. Cl. .................. 382/313; 382/165; 348/207.99

(58) Field of Classification Search ................ 382/107, 382/154, 162, 168, 189, 203, 207, 214, 219, 382/254, 274, 276, 285, 305, 314, 318, 321, 382/313; 235/462.45, 375; 358/1.9; 348/472.01, 348/207.99; 250/201.5; 347/239
See application file for complete search history.

(56) References Cited

U.S. PATENT DOCUMENTS

| 4,571,603 | A  | * | 2/1986  | Hornbeck et al. | ........... 347/239 |
| 6,483,092 | B1 | * | 11/2002 | Davis           | ........ 250/201.5  |
| 6,655,597 | B1 | * | 12/2003 | Swartz et al.   | ........ 235/462.45 |
| 6,804,026 | B1 | * | 10/2004 | Walmsley        | ............ 358/1.9 |
| 6,804,389 | B1 | * | 10/2004 | Ito et al.      | .............. 382/154 |
| 6,910,633 | B1 | * | 6/2005  | Swartz et al.   | ........ 235/472.01 |
| 6,983,878 | B1 | * | 1/2006  | Silverbrook et al. | ........ 235/375 |
| 6,992,702 | B1 | * | 1/2006  | Foote et al.    | ............ 348/211.8 |

* cited by examiner

*Primary Examiner*—Jingge Wu
*Assistant Examiner*—Seyed Azarian
(74) *Attorney, Agent, or Firm*—Birch, Stewart, Kolasch & Birch, LLP

(57) ABSTRACT

A small portable "pocket pen size" projector/image grabber device for allowing an individual to gather, share and exploit information in a projected format in real time, day or night, with other individuals on demand. An ultra high density MEMS mirror display array provides a 1024×768 line projection display. An on-axis 512×384 color CCD imager is also included resulting in a digitally-aligned image capture and overlay display capability. A sequentially-addressed three color chip laser and low cost plastic optics provides full color high resolution bright displays for group viewing. 3-D color imaging is also provided by a binocular attachment to the device which permits the capturing of three-dimensional imagery.

30 Claims, 5 Drawing Sheets

POCKET-PEN ULTRA-HIGH RESOLUTION MEMS PROJECTION DISPLAY IN COMBINATION WITH ON-AXIS CCD IMAGE CAPTURE SYSTEM INCLUDING MEANS FOR PERMITTING 3-D IMAGING

This application is a Non-Provisional application including the subject matter and claiming the priority date under 35 U.S.C. § 119(e) of Provisional Application Ser. No. 60/542,300, filed on Feb. 9, 2004, the contents of which are meant to be incorporated herein by reference.

BACKGROUND OF THE INVENTION

This invention relates generally to apparatus for capturing a visual image in real time and generating a projected visual image of a stored image with a micro-mirror array in a time shared operating mode and, more particularly, to a relatively small hand held device such as a pocket pen for capturing and projecting images including three-dimensional (3-D) images thereof.

With the advent of microelectromechanical systems (MEMS) technology, the Armed Forces have been extensively considering introducing Helmet Mounted Displays and/or Palm-Type Handheld Communication Devices for the soldier in the field. In the case of the Helmet display, although high resolution XGA-quality viewing is possible, the display is basically "Individual eye" in nature, and cannot be viewed collectively or conveniently by groups of individuals. The pocket-size Palm Display can be conveniently small, but when it is small, the screen area is too little to permit effective 1000 line high resolution viewing. By making the Palm screen larger, high resolution viewing improves, but the Palm device quickly loses its "pocket" convenience, and approaches the burden of carrying a Laptop. Neither device captures and immediately displays large screen information for discussion and group decision making, and/or base automatic target recognition (ATR) and annotation. Also, neither device captures battlefield scenes and maps/documents for Base ATR and annotation and subsequent high resolution re-projection as discussed herein.

SUMMARY

This invention is directed to a time shared image capture and projector system integrated in a relatively small elongated "pocket pen" type portable device including a charge coupled display (CCD) array, preferably, a color CCD array also having an infrared (IR) sensitivity capability for capturing an image and a microelectromechanical system (MEMS) mirror array for generating an image which is projected on display apparatus.

The CCD array comprises an on-axis 512×384 imager, which is precision-pixel-aligned with the mirror array, resulting in an image capture and overlay display capability of significant applicability, such as, but not limited to the downloading of maps and/or in the identifying of unknown topography in one application by military personnel through a capture/search/matching/overlay process. The MEMS mirror array comprises a high resolution 0.5 cm×0.4 cm MEMS mirror array projection display target fabricated using 5 micron square mirrors, so as to achieve a 1024×768 line projection display. A sequentially-addressed three color LED chip is also utilized in combination with a Schlieren type multi-lens optical projection system to produce an 18"×13.5" full color high resolution bright display. Full color is also achievable at XGA resolution for a small audience (8 to 10 persons). A transmit/receive (T/R) device along with a digital memory and computational means is also located in the housing of the pocket pen device so as to enable images to be uploaded and downloaded to and from remote communication apparatus on demand.

The fully-portable pen/projector/image capture pocket device is convenient to carry, yet capable of projecting a high resolution highly detailed Laptop quality full color image for multiple person viewing.

A physical attachment is also included which permits the capturing of three-dimensional imagery from a scene such as a battlefield, for example, for subsequent instantaneous three dimensional (3-D) projection thereof. Inexpensive disposable "paper" Polaroid glasses would be required to be worn, but no electrical synchronization between the glasses and the projector is required.

The combination of an on-axis pen sized system with image projector/capture capabilities, in accordance with the subject invention, enables real time functionality. One mode of operation of the system is real time image capture, image analysis and projected annotation. This mode can be extremely useful in the military for analyzing ground troop's field of view as captured by the pen's imaging system. By utilizing the Transmission/Receiver capabilities of this system, the image could be sent back to a remote location, such as a base for sophisticated automatic target analysis and image processing. After analysis and retransmission back to the pen, the image can be annotated with projected annotations. Furthermore, by continuously capturing, analyzing, and annotating the images, the projector system can warn and update the user, such as soldier(s) in the field of changing battlefield conditions, using remote expertise.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood when the detailed description provided hereinafter is considered together with the accompanying drawings which are provided by way of illustration only and thus are not meant to be considered in a limiting sense, and wherein.

DETAILED DESCRIPTION OF THE INVENTION

Figure 1:
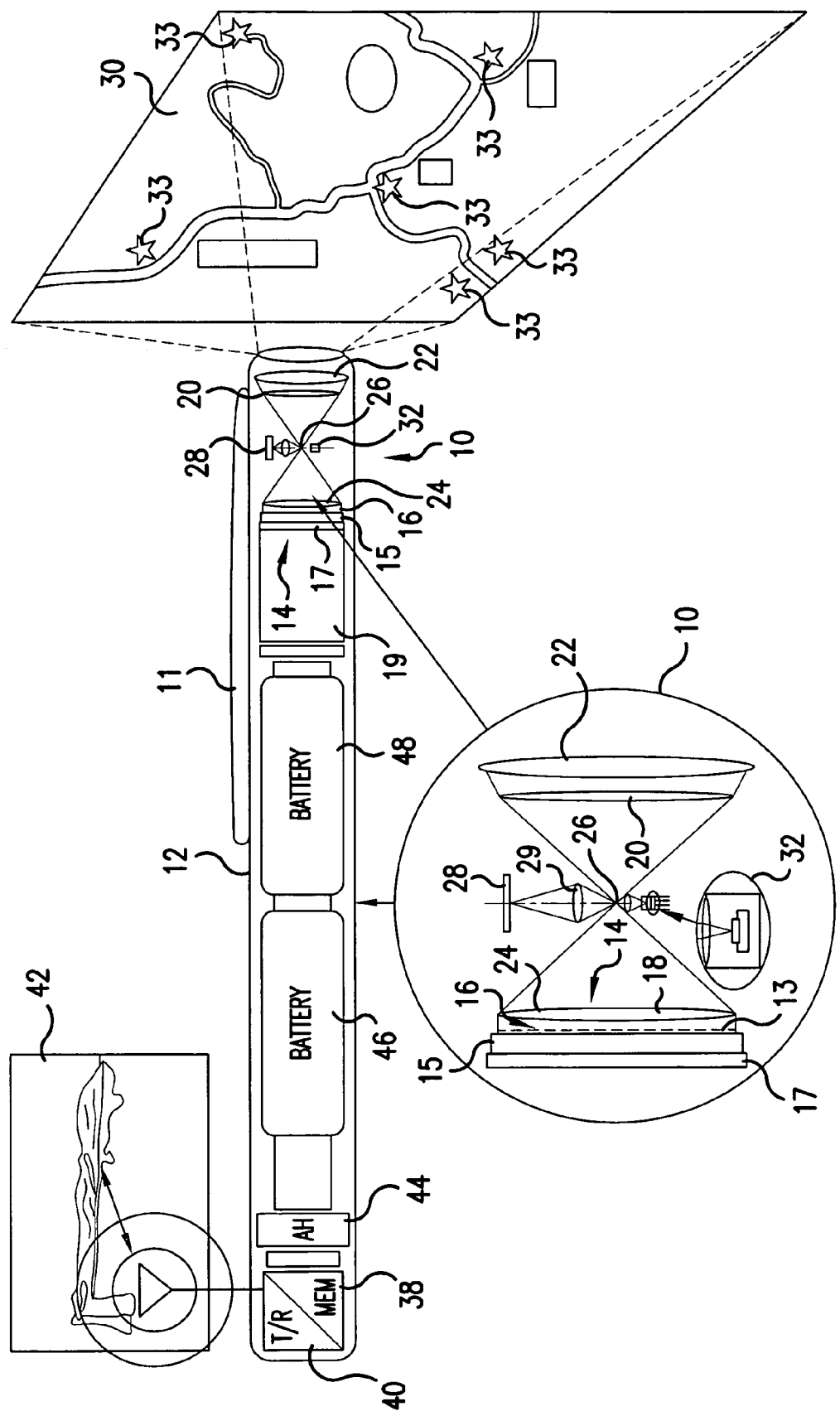
FIG. 1 is a longitudinal cross sectional view of a portable pen image projector and capture device in accordance with the subject invention.
Figure 2:
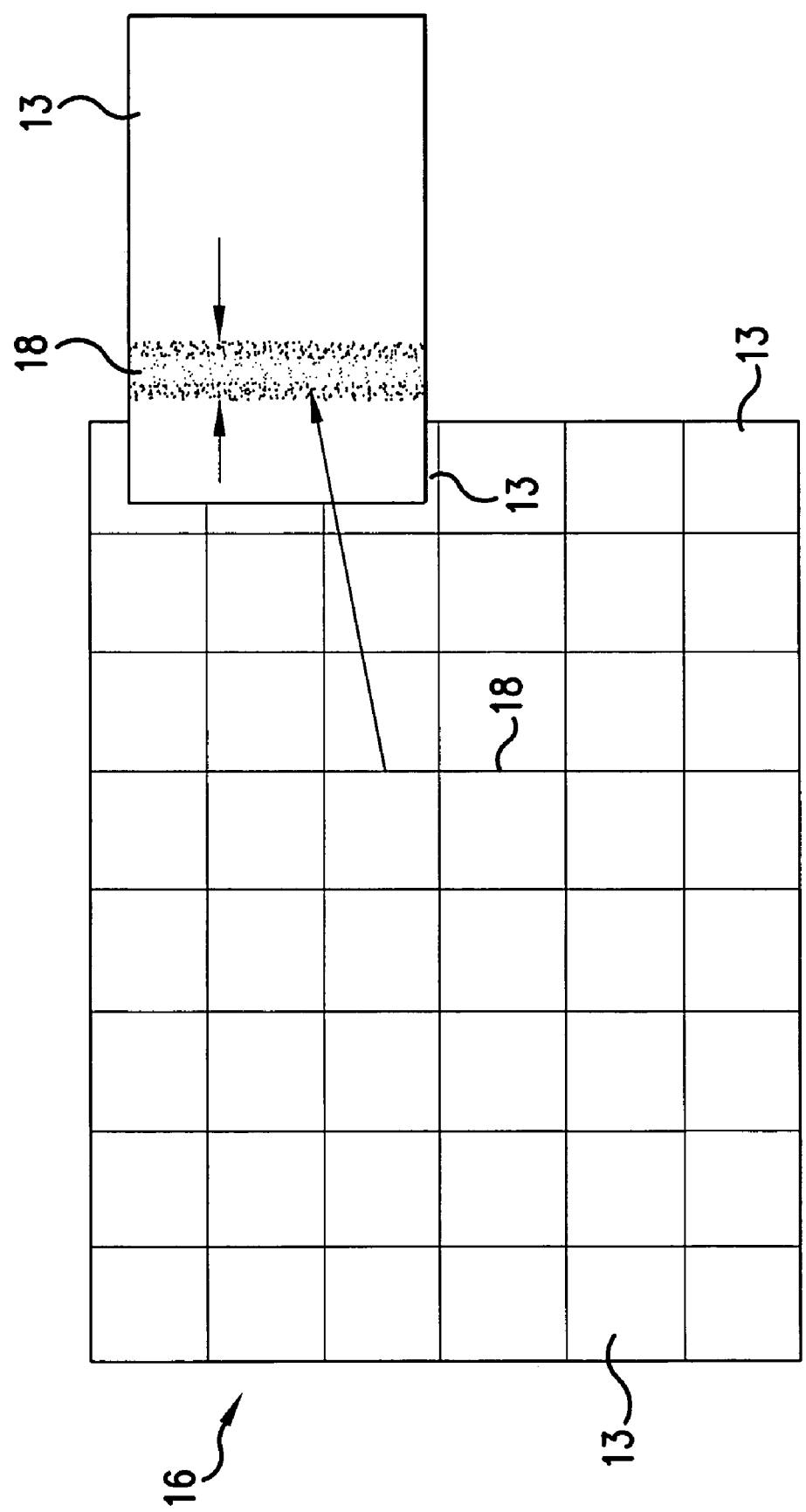
FIG. 2 is illustrative of the line spacing between mirror segments of an array of mirror segments utilized in the embodiment of the invention shown in FIG. 1.

Referring now to the drawing figures, FIG. 1 is illustrative of a projector/frame grabber system in accordance with a preferred embodiment of the subject invention. The key element in the system is an image projector/image capture head 10 shown in the insert of FIG. 1 located in a pocket pen type housing 12. Reference numeral 11 refers to a pocket clip. In the insert, a very high resolution microelectromechanical system (MEMS) image projector 14 is shown including an electronically-addressable micro-mirror array chip 16 consisting of, for example, a matrix of 1024×768, 5 micron square mirrors 13, at a density of 200 mirrors/mm., with 1300 Å line spacing 18 as shown in FIG. 2. When desired, a 1024×1024 matrix could be utilized for higher resolutions.

In order to get such a high resolution, electron beam lithography is utilized. The 5 micron square mirrors 13 are fabricated using EBEAM apparatus which takes about 3 to 5 minutes to write the mirror part of the target. With 1300 Å spaces 28 between the mirrors 13, reflective efficiencies around 95+% can be achieved which are high enough for bright color 0.5 meter square projections with brightness approaching that of a conventional Laptop display. The smooth lines at the edge of the mirror predict minimum excess isotropic scattering and therefore high contrast, limited primarily by diffraction for this acutely high density array. With the 5 microns square mirrors 13, being greater than 10 visible wavelengths in size, diffractive scatter will be minimum.

Figure 4:
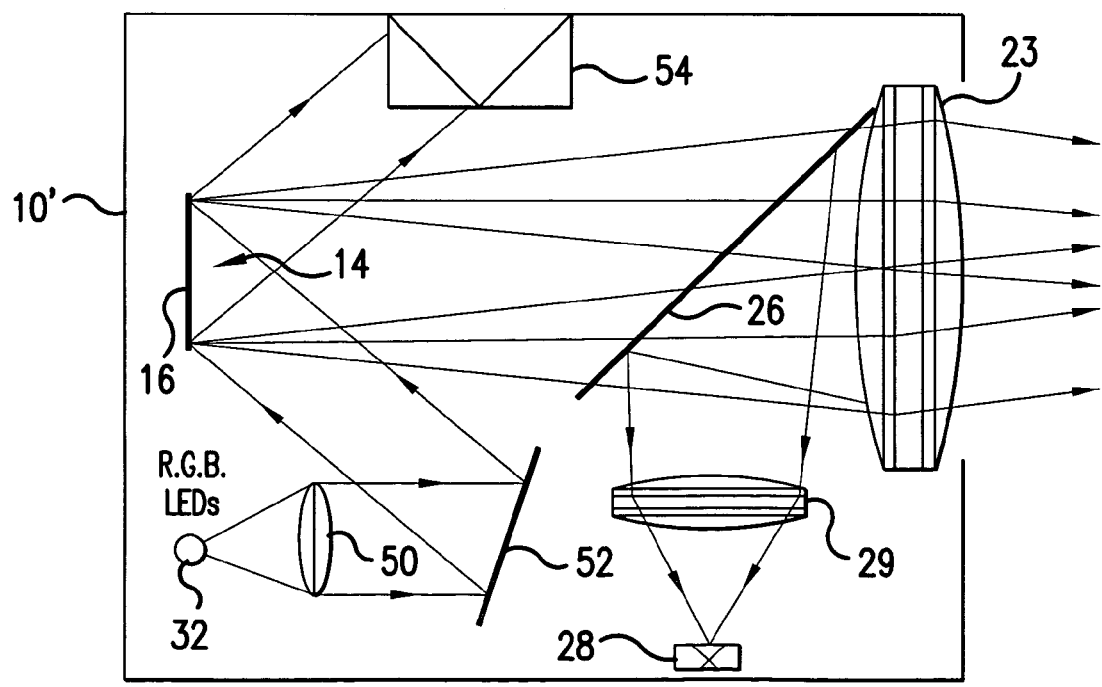
FIG. 4 is a diagram illustrative of a modified arrangement of imaging and projection apparatus shown in FIG. 1.

The electronically-addressable micro-mirror array chip 16 also includes an underlying driver section 15 mounted on a substrate 17 and is located in the pocket pen type housing 12 adjacent controller circuitry 19. An optical projection system such as a multi-lens Schlieren optical projection system such as shown in FIG. 1, includes, for example, lenses 20 and 22 along with a lens 24 adjacent mirror chip 16 and a beam splitter 26 in the form of an optical cross stop #22 oriented at an angle 45° so that incoming light of an image is folded upwards to a charge coupled device (CCD) imaging array 28 through a lens 29 while light from the image projector 14 is transmitted unimpeded through the beam splitter 26 to a display screen 30 or the like. Another embodiment of the image grabber and projection is shown in FIG. 4 and will be described hereinafter.

The CCD imaging array 28 is comprised of CMOS devices which are sensitive to both color and, when desirable, infra-red (IR) light and acts as an image frame grabber of an image viewed through the lenses 20 and 22. The 45° tilt of the beam splitter 26 provides maximum fixed pattern noise decoupling.

The MEMS mirror array 16 has high reflectivity and high Fill-Factor, leading to brighter projections with a given source. This is in contrast to a conventional Liquid Crystal Displays-on-Silicon, which may have 10× the pixel size, and therefore 10× the chip size, and well below 50% of the optical brightness.

Figure 3:
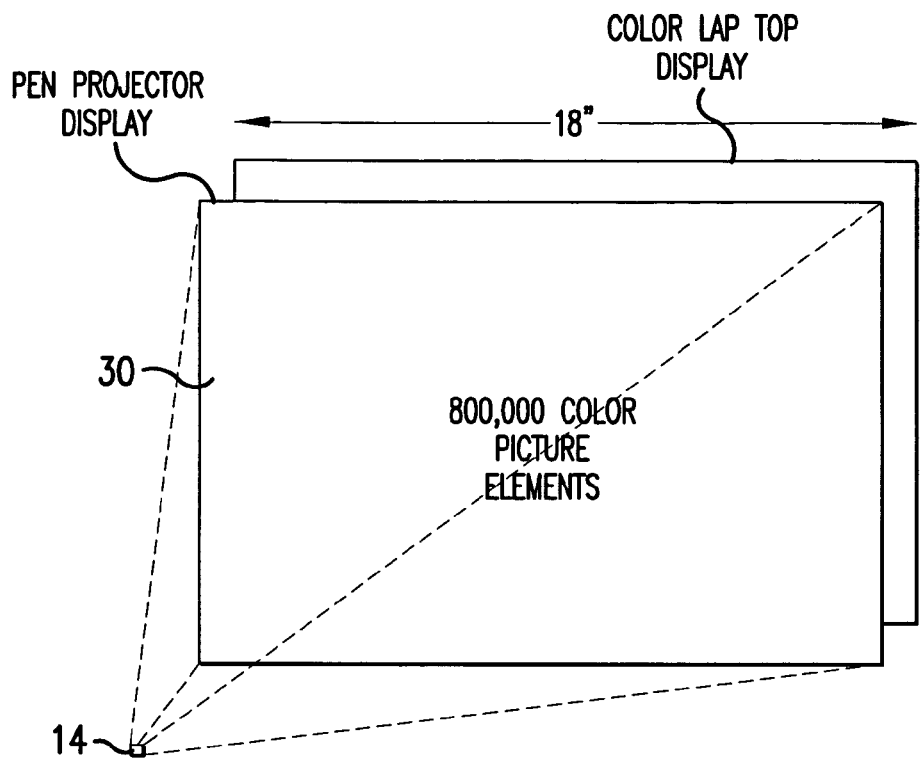
FIG. 3 is illustrative of the image projection capability of the invention.

FIG. 3 is a diagram illustrative of the size of an image which can be projected by image projector 14 in relation to a conventional color lap top display. The display 30 is increased in the subject invention by an order of magnitude from current projection devices, up to 200 projection mirrors/mm (5 micron mirrors) using Electron Beam Lithography, so that, for example, an 800,000 element display target will fit inside a highly portable 1.5 cm diameter pen format. Each projection element is enlarged by a factor of 10,000 times in area, producing a half meter by half meter high brightness display having XGA level color resolution participation.

Figure 7:
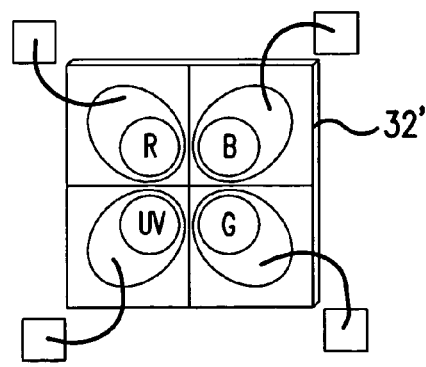
FIG. 7 is illustrative of an arrangement of light emitting diodes (LEDs) for generating color images with the projection apparatus shown in FIGS. 2 and 6.

Also included in the projection head 10 of the pocket pen device 12 is a light source 32 comprising a small LED or laser diode package containing three high luminance closely-co-located LEDs or laser diodes of wavelengths centered at Red, Green and Blue respectively. As the colors are sequentially repeated, the effect of a moving color wheel is simulated, resulting in a full color display in a very small package as the three color separation portions of the projected image are combined in the eye as a full-color image. When desirable, the addition of a fourth co-located UV LED or laser diode can be included in the light source 32' as shown in FIG. 7 which opens up the device 12 to designation modes.

Also located in the pocket pen housing 12 is a digital memory 38 for storing images that are captured by the frame grabber CCD array 28 and for storing images which are to be projected by the image projector 14, as will be explained hereinafter. Located adjacent the memory 38 is an RF transmitter/receiver (T/R) module 40 which is adapted to transmit and receive signals directly to and from a remote location 42 such as a base combat station or through an airborne communications link, as shown. When desirable, captured images can be applied directly to the T/R module 40.

A personal security fingerprint or other type of identification (ID) means 44 can also be included in the housing 12 for disabling the system if lost, for example. A pair of DC batteries 46 and 48 are also shown in FIG. 1 for powering the various components.

A modification of the image/image capture/projector head 10 is shown in FIG. 4 by reference numeral 10'. The light source 32 consisting of a red, blue and green light emitting diodes are now located to one side of the MEMS image projector 14 with light being directed to the micro-mirror array 16 at an angle by means of a condenser lens 50 and a fold mirror 52 so that light which is not to be projected from the micro-mirror array 16 is reflected to a light capture element 54, while light which is to be projected to the display 30 is transmitted to a lens assembly 23 through the beam splitter 26 when a predetermined number of mirrors are driven in each image frame sequence from a flat OFF state and to an angulated or forwardly tilted, preferably 20°, ON state. However, smaller or larger tilt angles can be utilized if need be.

Figure 5:
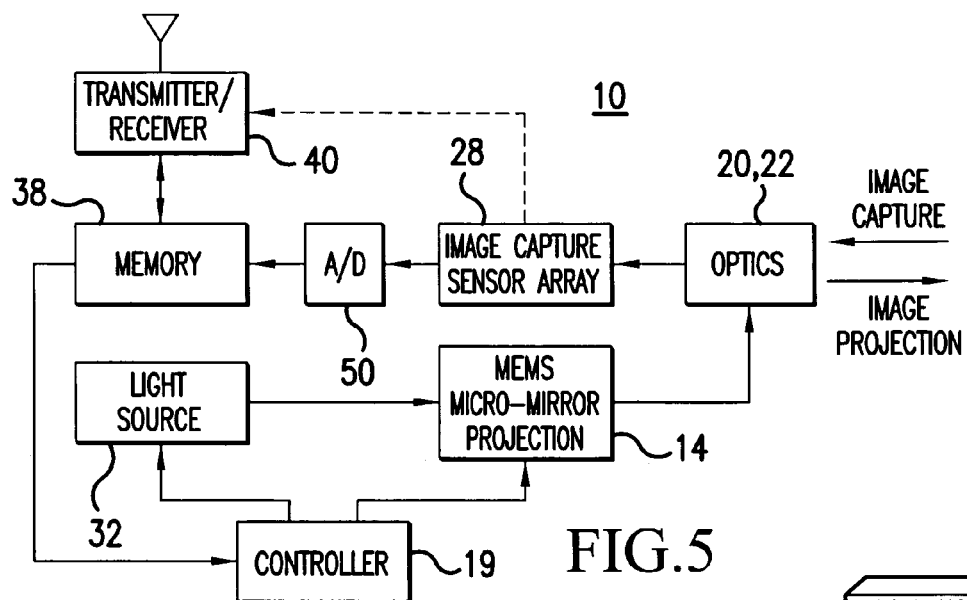
FIG. 5 is an electrical block diagram of the invention shown in FIG. 1.

The functionality of the subsystems integral to the projector/capture operation is further shown by the block diagram illustrated in FIG. 5. As noted above, the optical system, composed of the projector/frame grabbing head 10, is vital to the unique pen-sized image projector/capture functionality. Also as stated above, in order to allow incoming light to reach the CCD capture array 28 and projected light from the MEMS micro-mirror array 14 to pass unobstructed through the objective lens 22, a standard optical cross stop #22 beam splitter 26 is placed adjacent thereto at 45°. Therefore, light that is captured from the objective lens 22 is folded by the optical stop 26 upwards onto the CCD imaging array 28. The CCD array 28 converts the light energy collected by the pen's objective lens and imaged onto the array, into representative analog electrical current. This analogue electrical signal is then digitized by an analog to digital (A/D) converter 50, yielding a discrete digital number representing the captured image brightness at every pixel location. Further as noted above, the memory block 38 allows storage of captured images from the CCD sensor array 28 as well as storage of downloaded images from an external source such as a remotely located combat base 42 prior to projection. The transmitter/receiver module 40

MEMS mirrors 16 to be collected and projected through the optical cross stop 26, onto the display 30.

It should also be noted that it is possible to form any color by projecting the pixel's complimentary color components Cyan (Green and Blue), Magenta (Red and Blue), and Yellow (Red and Green). Since the complementary colors are formed by projecting the light from two simultaneous LEDs, any color would be projected with double the brightness. Such a projection technique can be invaluable for hand-held projection devices which require sufficient brightness to project images in daylight conditions using non-ideal projection screens.

Table I below discloses several operational modes which may be used, for example, but not limited to, military use in a battlefield environment.

TABLE 1

|  | Modes Using Transmit/Receive Capabilities on Pen | Modes Utilizing Internal Pen Memory | Unique Combination of Capture/Projection Modes |
|---|---|---|---|
| Projector-Based Modes | Base Sends Orders-of-Day to Pen Memory for Projection Base Sends Results of ATR or Battlefield Damage Assessment to Pen Memory for Overlay Projection | Projection of Detailed Received Maps Projection of Previously-taken Forward Observer Photographs from Base for Comparison to Present Topography for Discerning Targets of Opportunity | Alternating Framing of Projected and CCD Image, allowing Grease Pen-Like Annotated Communication with Base for Emerging Strategic Decisions Target Designation |
| CCD Image Capture-Based | Pen Used for Photographic Capture of e.g. Battlefield Damage Assessment from Viewpoint of Individual Soldier Pen Used for Medical Aid by Capturing Hi Res Color Wound Imagery Pen 'faxes' graphical info to base | Capture of Photos of Forward Geography to Memory Capture of locally-annotated Documents to Memory for Projection for whole Group to see (XEROX Mode) | Modes where Optional UV Code-Pulsed Laser (also in Laser part of Pen Package) is used to Project Coded Acquisition Signals onto Forward Target Arena Using 1 micron IR sensitivity of CCD to see e.g. warm targets in dark (See FIG. 2.2) Full color Three Image Capture using RGB Laser(s) as Sequential Illuminators and CCD as Three Frame Capture Medium | enables the real time upload of captured images to base 42 for evaluation or further image processing and automatic target recognition (ATR analysis) and the download of images to be projected or annotated by the image projector 14. In the projection mode, images are formed by a standard time multiplexing technique system in which the bit information of each pixel is read from memory 38 and converted to digital signals, which are then applied by the controller 19 to a driver element, not shown, under each mirror, allowing them to flip, for example, between ON and OFF positions, for a discrete time period for enabling 256 shades of intensity of each pixel to be represented by the corresponding mirror of the array 14. Furthermore, this pixel intensity is projected through the optics onto the display screen 30.

Figure 6:
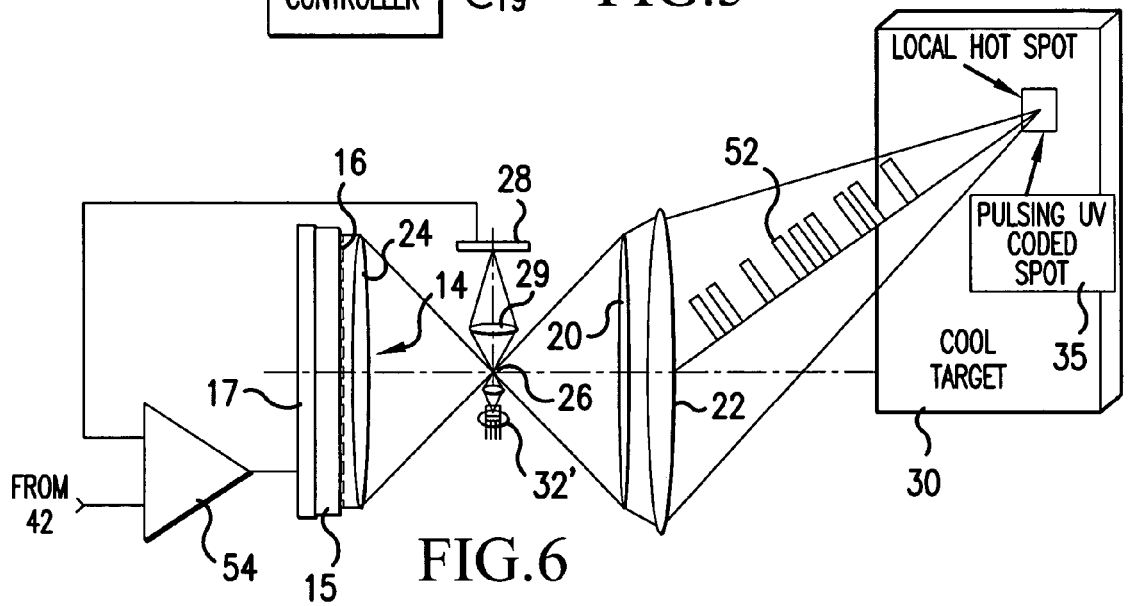
FIG. 6 is a diagram illustrative of one mode of operation of the embodiment shown in FIG. 2.

In order to generate color images, three digital numbers are needed for each pixel representing the red, blue, and green components of the overall color. In this case, the controller sequentially turns on each of the red, green, and blue LEDs in the light source for ⅓ of the time period between subsequent image frames. For each LED, the corresponding shade of intensity of each pixel is projected and allowing the proper shade of color to be displayed on the screen. The projection optics allows the light from the One of the Modes suggested in Table I is illustrated in FIG. 6, where the coaxial location of a 512×384 color CCD array 28, shown opposite from laser light source 32 at the beam splitter 26, allows the possibility of convenient coded handheld designation of a target of opportunity 33 shown in FIG. 1. In FIG. 6, illustrated is a case where the CCD array 28 includes an augmented response to IR radiation alternates frame grabbing with projection where, for example, the UV LED or laser diode in the laser light source 32' overlays a local "hot spot" 35 detected by the color CCD array 28 with a coded invisible UV pulse train 52 in response to a target designation received from base 42, for example, shown in FIG. 1. The MEMS projector 14 puts the UV designator signal precisely where the CCD array see the hot spot via a signal combiner 54.

Additionally, and most importantly, the CCD array 28 is precisely aligned 90 degrees to the projection axis and on the other side of the 45° opaque mirrored stop 26 such that every four projection mirrors 16 are in the same optical plane as, and precision aligned to one of the LEDs or laser diodes in the CCD array 28. In this manner, the array 28 and memory 38 can capture, record, and precisely store any scene in front lens 22 of the pen 12 using the same lens system as the projection part of the system. This allows a user, for example but not limited to a soldier, to use a photo-capture mode to "snap a color picture" of what's occurring in front of the pen, permitting, e.g., the remote combat station 42 to assess the topological detail in the current direction towards which the pen is pointing.

Also, the pocket pen device 12 can be used to make out and annotate various other types of hot spots, including exhaust from armored vehicles or enemy soldiers in the field. Furthermore, due to the differences in reflection between near IR and visible light, it is possible to distinguish hidden camouflaged armored vehicles from normal green vegetation.

Of additional importance, because of the precise pixel to mirror alignment, this feature allows the base station 42 to precisely overlay, in real time, targets of opportunity 33 on any snapshot of the scene in front of a soldier, for example, in a precise and high resolution manner, without moire effects, to the full resolution capabilities of the display.

Figure 10:
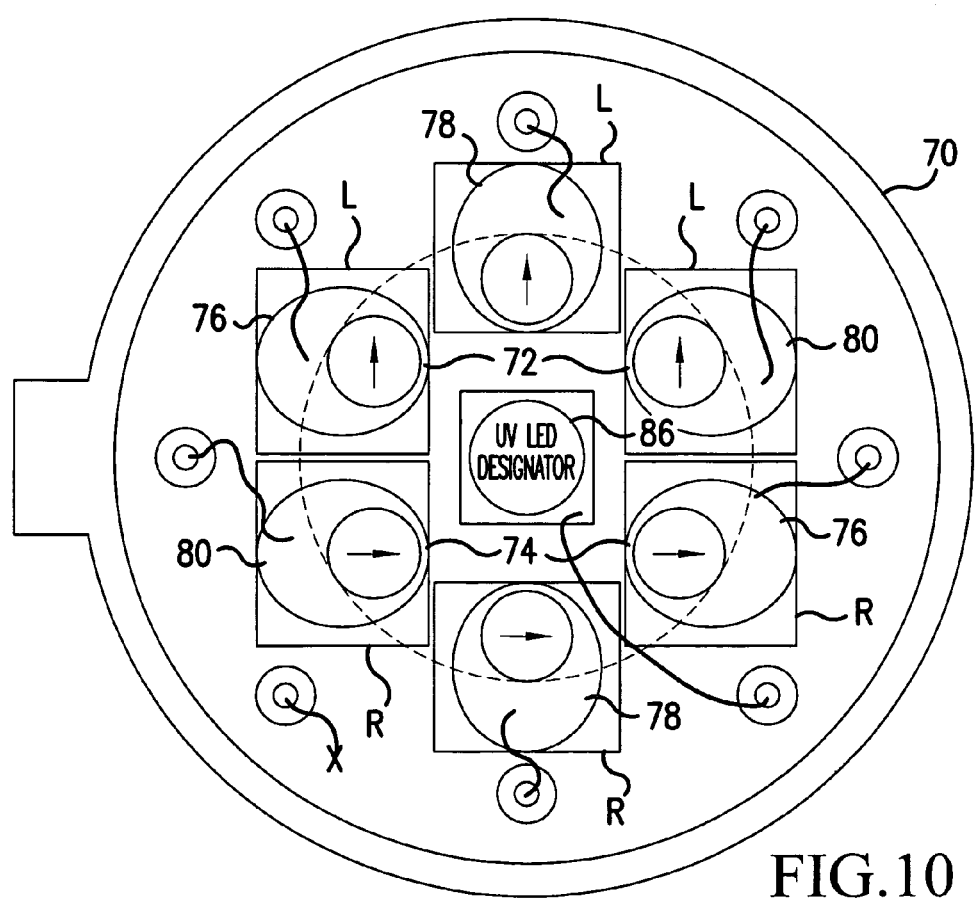
FIG. 10 is illustrative of an arrangement of six light emitting diodes and polarization filters for generating 3-D color images in accordance with a second embodiment of the invention.

Features of this Projection/CCD combination are further summarized in the following Table 2.

repeatedly fed to the micro-mirror array 14 for display projection, while synchronously being illuminated by a six LED illuminator assembly 70 as shown in FIG. 10.

The illuminator 70 contains built-in vertically polarized LED filters 72 for the left eye (L), while horizontally polarized filters 74 for the right eye (R) and two sets of Red, Green and Blue emitting diodes 76, 78, 80. Note that in FIG. 9, Liquid Crystal shutters 82 and 84 are located in the 3-D attachment 54 to make sure the L and R images are presented one after the other and not simultaneously to the image grabber CCD array 28.

FIG. 10 also illustrates on-chip geometrically-offset LED regions for achieving a tight LED circle for greater projection contrast, plus a center UV illuminator designator 86. In this manner, 3-D images can be rapidly taken at XGA (1024×768) full color resolution and immediately can be projected for users, such as soldiers wearing inexpensive polarized eyeglasses made of paper, for example, to view "as a team" for decision making involving tactical and strategic choices based on high-resolution depth information. Accordingly, a six LED Source plus a "stereographic arm" attach-

TABLE 2

| Unique Program Features | Functions | Benefits |
| --- | --- | --- |
| High Res 1024 × 768 Pocket Display, equal to a high end desktop, w/o weight and volume of a Laptop | 1024 × 768 display can be easily seen by a group through projection optics to discern subtle but important target details | Lightweight Portability High Res Details for ID |
| Higher resolution than Palm Top Displays presently being considered by military; 8+ people can see display simultaneously and advise and consent | High Resolution encourages broad image recognition utility in field environment; as well as 'ownership' of subsequent decisions, as required. | High Res permits precision target designation-to-photo overlay in full color |
| Very light weight encourages use by individual soldier, without him 'throwing it away' | Whether taking photos and retransmitting to base, or projecting pictures from base, it is lightweight AND useful . . . a virtual pocket auditorium. | Display can be 'shared' for Group Viewing consultations and decision making |
| Combination of CCD and Projector offers Overlay Capability when fed by Base/UAV Information Source | Unique overlay capabilities with digital pixel-to-pixel synch permits blending of photography and remote designation. | Registration allows base-fed color target discrimination with pixel to pixel overlay without moiré effects |

Because of the unique combination of a personal portable high resolution image Projector 14 and pixel-aligned CCD array 28, many potentially attractive modes of interest to a soldier in combat are contemplated for this invention. However, other types of non-military uses are also contemplated. For example, the attachment of a miniature projection unit in accordance with the subject invention to a digital camera would allow instant projection of a photo on a wall as opposed to squinting at a 1 in. by 1.5 in. TFT panel on the back of the camera. Also, the device can be used as a projection means for entertainment purposes as well as generating a bulletin for individual users.

Figure 8:
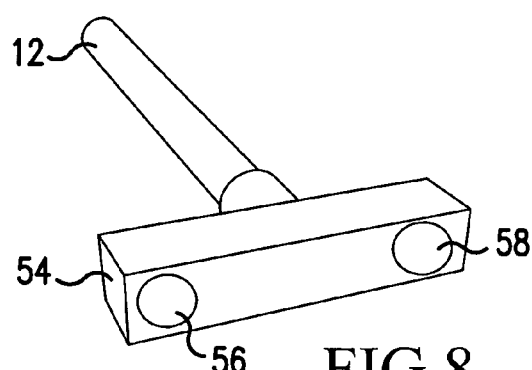
FIG. 8 is a perspective view of a 3-D attachment for the portable pen in FIG. 1.
Figure 9:
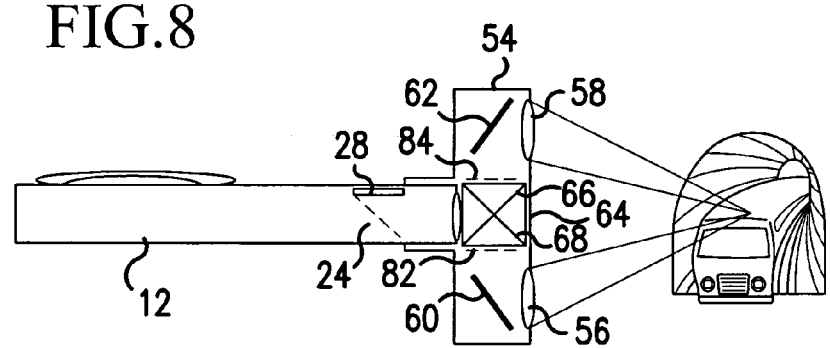
FIG. 9 is a longitudinal cross-sectional view of the attachment for producing 3-D imagery shown in FIG. 5 mounted on the end of the portable pen device.

A second embodiment of the invention is shown in FIGS. 8, 9 and 10. In FIGS. 8 and 9 there is shown a three-dimension (3-D) attachment 54 consisting of two lenses 56 and 58 separated by 6 in. to 12 in. or more depending on the 3-D effect desired and a pair of mirrors 60 and 62, and a two-way 45° prism 64 including mirror type faces 66 and 68 permits the single lens 22 of the original pocket pen color sensitive CCD array 28 with appropriate built-in color filter on the chip in the image grabber to see two Red, Green and Blue (RGB) sets of stereo-separated images. These six images are grabbed and stored in the Pen's Memory 38 and either transmitted to the base 42 for analysis, or the six LR/LB/LG and RR/RB/RG images are sequentially and ment 54 permits 3-D image capture and full color 3-D projection in high-resolution is provided for use, for example, by a soldier on the ground.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. Apparatus for both capturing an image and projecting an image, comprising:

image capturing apparatus including a multi-pixel array of light sensitive devices for capturing a viewed image;

projection apparatus including a microelectromechanical system (MEMS) multi-pixel mirror array for projecting an image on display apparatus;

a relatively small hand-held device for housing both said image capturing apparatus and said image projection apparatus and wherein the multi-pixel array of light sensitive devices and the multi-pixel mirror array are aligned on a common central light axis, and wherein the pixels of the multi-pixel array of the image capturing apparatus are matched pixel-to-pixel with the mirrors of the multi-pixel mirror array of the projection apparatus;

an optical assembly located in said hand-held device for both transmitting light from a viewed image to the multi-pixel array of the image capturing apparatus and for projecting light from the multi-pixel mirror array of the projection apparatus to the display apparatus in a time shared operational mode;

wherein the optical assembly comprises at least one objective lens located at one end of the device and an optical beam splitter located behind the objective lens for folding light of an image captured by the objective lens to the multi-pixel array of the image capturing apparatus and for transmitting light from an image generated by the multi-pixel mirror array of the projection apparatus substantially unimpeded through the beam splitter and the objective lens on said common central light axis; and wherein the beam splitter is oriented at an angle of substantially 45° relative to the objective lens and the common central light axis and wherein the multi-pixel array of the image capturing apparatus is located on one side of the beam splitter and oriented at an angle of 90° relative to the common central light axis whereby an image viewed by said image capturing apparatus and an image projected by said projection apparatus include pixel-to-pixel matching therebetween thereby enabling simultaneous aligned overlay and annotation of displayed images.

2. The apparatus according to claim 1 wherein said hand-held device is comprised of an elongated body having a generally cylindrical cross section.

3. The apparatus according to claim 2 wherein said hand-held device is generally in the shape and size of a pocket pen.

4. The apparatus according to claim 1 wherein said multi-pixel array of light sensitive devices comprises an array of light sensitive semiconductor devices.

5. The apparatus according to claim 4 wherein said semiconductor devices comprise charge coupled devices.

6. The apparatus according to claim 5 wherein said charge coupled devices comprise CMOS devices.

7. The apparatus according to claim 4 wherein said semiconductor devices are color sensitive as well as being sensitive to infra-red radiation.

8. The apparatus according to claim 7 wherein said semiconductor devices comprise charge coupled devices.

9. The apparatus according to claim 8 wherein said charge coupled devices comprise CMOS devices.

10. The apparatus according to claim 1 wherein said image projecting apparatus includes a light source for generating light signals of an image to be projected to and reflected from the MEMS mirror array and a controller for controlling the operation of the light source and actuation of the MEMS mirror array for projecting the image to said display apparatus.

11. The apparatus according to claim 10 wherein said MEMS mirror array includes a matrix of mirror elements which are selectively activated in each image frame between a substantially flat OFF state and an upwardly angulated ON state for a predetermined time period.

12. The apparatus according to claim 11 wherein said mirror elements angulated upwardly in the ON state to or about 20°.

13. The apparatus according to claim 12 where the predetermined time varies as a function of desired image intensity.

14. The apparatus according to claim 10 wherein said light source comprises a plurality of mutually different light sources which are sequentially activated to produce a color image.

15. The apparatus according to claim 14 wherein said plurality of mutually different light sources include red, green and blue light sources.

16. The apparatus according to claim 15 wherein said red, green and blue light sources comprise light emitting diodes or laser diodes.

17. The apparatus according to claim 15 wherein said plurality of mutually different light sources additionally include an ultra-violet light source.

18. The apparatus according to claim 17 wherein said ultra-violet light source comprises a light emitting diode or laser diode.

19. The apparatus as according to 10 and additionally including an analog-to-digital signal converter and a digital memory connected to the pixel array of the image capturing apparatus for storing analog light images captured thereby.

20. The apparatus according to claim 19 and additionally including transmit/receiver apparatus for uploading one or more images captured by image capturing apparatus to a remote signal source and for receiving one or more images downloaded from the remote signal source, and wherein the memory is also connected to said transmitter receiver apparatus for storing said one or more images downloaded from the remote signal source and thereafter feeding the downloaded images to the controller for generating one or more for projection by said display apparatus.

21. The apparatus according to claim 20 wherein said remote signal source comprises a base station or an airborne communications link interconnected with a base station.

22. The apparatus according to claim 20 wherein said one or more images generated for projection include image evaluation.

23. The apparatus according to claim 20 wherein said one or more images generated for projection includes automatic target recognition.

24. The apparatus according to claim 20 wherein said one or more images generated for projection include annotation.

25. The apparatus according to claim 1 and additionally including secondary lens means located between the beam splitter and the array of light sensitive devices for transmitting light from the beam splitter to the image capturing apparatus.

26. The apparatus according to claim 1 and additionally including an attachment to the hand-held device for providing a three dimensional image of a viewed image, said attachment including:

a pair of spaced apart objective lenses,
a pair of inwardly reflective mirror elements located behind said objective lens,
a pair of two-way 45° prisms located between the reflective mirror elements, and
shutter means located adjacent the prisms for permitting two successive stereographic frames to be applied to said image capturing.

27. The apparatus according to claim 26 and additionally including light emitting means for providing a three dimensional color image of the viewed image.

28. The apparatus according to claim 27 wherein said light emitting means includes two sets of red, green and blue light emitting diodes alternately energized in sequence to provide two sequential views of a color image of the viewed image.

29. The apparatus according to claim 28 and additionally including polarization filter means having a first type polarization located in front of one set of said two sets of red, green and blue light emitting diodes and polarization filter means having a second type polarization located in front of the second set of said two sets of light emitting diodes for producing a stereoscopic effect of the viewed image.

30. The apparatus according to claim 29 and additionally including an ultra-violet light emitting diode within the two sets of red, green and blue light emitting diodes for acting as a designator light source.

* * * * *